(12) United States Patent
Garelli et al.

(10) Patent No.: US 9,977,467 B2
(45) Date of Patent: May 22, 2018

(54) ELECTRONIC DEVICE WITH AN ENCLOSURE STIFFENER

(71) Applicant: Apple Inc., Cupertino, CA (US)

(72) Inventors: Adam T. Garelli, Sunnyvale, CA (US); Dinesh C. Mathew, Fremont, CA (US); Nicholas A. Rundle, San Jose, CA (US); Simon Regis Louis Lancaster-Larocque, Gloucester (CA)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/641,199

(22) Filed: Mar. 6, 2015

(65) Prior Publication Data

US 2016/0054762 A1 Feb. 25, 2016

Related U.S. Application Data (60) Provisional application No. 62/039,318, filed on Aug. 19, 2014.

(51) Int. Cl.
G06F 1/16 (2006.01)

(52) U.S. Cl.
CPC .......... *G06F 1/1656* (2013.01); *G06F 1/1637* (2013.01)

(58) Field of Classification Search
CPC .... G06F 1/1656; G06F 1/1637; G06F 1/1613; H04M 1/0277
See application file for complete search history.

(56) References Cited

U.S. PATENT DOCUMENTS 5,666,261 A 9/1997 Aguilera
8,879,249 B1 11/2014 Wanderman et al.
2003/0122994 A1* 7/2003 Chen ................. G02F 1/133308
349/58
2009/0257207 A1* 10/2009 Wang .................... G06F 1/1626
361/752
2010/0203850 A1* 8/2010 Norris .................... G08B 5/223
455/90.3

(Continued)

FOREIGN PATENT DOCUMENTS

WO WO 2009/102326 A1 8/2009

OTHER PUBLICATIONS

McCarthy et al., "Creating Complex Hollow Metal Geometries Using Additive Manufacturing and Electroforming", DREAM Lab, Virginia Tech, Blacksburg, VA, Aug. 22, 2012, pp. 108-120.

*Primary Examiner* — Dimary Lopez Cruz
*Assistant Examiner* — Abhishek Rathod
(74) *Attorney, Agent, or Firm* — Dickinson Wright RLLP (57) ABSTRACT

An electronic device can include a processor, output device (s) coupled thereto, and an outer housing or enclosure containing these and other electronic and/or optical items. The enclosure can include a substantially thin contoured component having an external surface exposed to a user and an internal surface. A stiffening plate situated with respect to the internal surface provides a substantial increase in the torsional stiffness and/or bending stiffness of the enclosure. The stiffening plate and contoured component can form a cavity therebetween, and one or more ridges, fins, plates, foam structures and/or other structural items can be located within the cavity. In various embodiments, the device can be a laptop computer and the contoured component can be a dome shaped outer housing behind the display portion thereof.

14 Claims, 10 Drawing Sheets

(56) References Cited

U.S. PATENT DOCUMENTS

| | | | | |
|---|---|---|---|---|
| 2010/0315570 A1* | 12/2010 | Mathew | G06F 1/1637 | 349/58 |
| 2010/0315769 A1* | 12/2010 | Mathew | G06F 1/1637 | 361/679.29 |
| 2011/0103041 A1* | 5/2011 | Mathew | G06F 1/1616 | 362/97.3 |
| 2011/0109829 A1* | 5/2011 | Mathew | G02F 1/133514 | 349/58 |
| 2011/0164365 A1* | 7/2011 | McClure | G06F 1/1613 | 361/679.3 |
| 2012/0044635 A1* | 2/2012 | Rothkopf | G06F 1/1626 | 361/679.54 |
| 2012/0050988 A1* | 3/2012 | Rothkopf | H04M 1/0266 | 361/688 |
| 2014/0092564 A1* | 4/2014 | Chuang | H05K 7/06 | 361/730 |
| 2015/0092334 A1* | 4/2015 | Hayashida | G06F 1/1601 | 361/679.21 |
| 2015/0192958 A1 | 7/2015 | Sprenger | | |

\* cited by examiner

ELECTRONIC DEVICE WITH AN ENCLOSURE STIFFENER

CROSS REFERENCE TO RELATED APPLICATION

This application claims priority from U.S. Provisional Patent Application No. 62/039,318, filed Aug. 19, 2014 and entitled "ENCLOSURE STIFFENER FOR ELECTRONIC DEVICE," which is incorporated herein in its entirety and for all purposes.

TECHNICAL FIELD

The described embodiments relate generally to personal electronic devices, and more particularly to enclosures for such personal electronic devices.

BACKGROUND

Personal electronic devices such as smart phones, portable media players, personal digital assistants, laptop computers, desktop computers, and the like are becoming increasingly prevalent in modern society. While newer generations of these devices are becoming faster, more sophisticated, and more powerful, many are also becoming smaller and sleeker at the same time. It is generally well known that electronic device makers often strive for new device designs that are smaller and lighter than previous generations of similar devices. To this end, many electronic device components are reduced in size whenever possible. For example, an outer housing or enclosure of an electronic device can not only be made smaller in length, width, and height, but also in thickness. Such reductions not only help to make the overall device smaller, but also lighter due to the use of less material in order to form the device enclosure.

Unfortunately, there can be limits to the outer housing or enclosure of the device becoming too thin. At some point, further reductions in thickness to the metal, plastic, or other enclosure components can result in a significant loss in torsional stiffness, bending stiffness, and overall structural integrity to these components. Because many electronic device enclosures are intended to provide overall structural integrity to the device, as well as protection to internal electronic device components such as display screens, processors, keyboards, touchpads, speakers, and the like, some minimum level of strength or stiffness is required for such enclosure components. Accordingly, there is a limit as to how thin device enclosures can become before the loss in structural integrity is too much of a detriment to offset any benefit in reduced weight and size to the component.

While designs and appearances for personal electronic devices have worked well in practice over many years, there is always a desire for improvement. Hence, there remains a need for improved electronic device enclosures that are thinner and lighter while still providing sufficient structural integrity.

SUMMARY

It is an advantage of the present disclosure to provide electronic devices having enclosure components that are significantly thinner and lighter while still retaining sufficient torsional stiffness, bending stiffness, and structural integrity. This can be accomplished at least in part through the use of a thinner contoured enclosure or outer housing that is coupled to a stiffening plate providing added torsional and bending stiffness and strength to the enclosure. Additional structural items, such as ridges, fins, honeycomb, and/or a foam layer can also be provided, such as within a cavity formed between the stiffening plate and the enclosure component.

In various embodiments of the present disclosure, an enclosure for an electronic device can include an outer housing component and a stiffening plate that may be coupled thereto. The outer housing component can be adapted to contain one or more internal electronic and/or optical device components, and can include a substantially thin region having an external surface exposed to a user thereof and an internal surface that is within the electronic device. The stiffening plate can be situated with respect to the internal surface of the outer housing component, and can provide a substantial increase in the torsional and bending stiffness across the outer housing component.

In various detailed embodiments with respect to the foregoing general embodiments, an internal cavity can be formed between the outer housing component and the stiffening plate. Furthermore, one or more additional structural components can be located within the internal cavity. This additional structural component(s) can include a foam material, and/or ridges, fins, or other features that are separate, that are integrally formed with or from the outer housing component, that are integrally formed with or from the stiffening plate, or any combination thereof. In addition, the stiffening plate, outer housing component, or both, can include one or more openings extending therethrough, with such opening(s) being adapted to route one or more components into or out of the internal cavity. For example, the opening(s) can be used to route non-structural components such as connectors, wires, flex circuits, and the like, such as where the internal cavity might contain integrated circuitry, storage, LEDs, or other electronic components. As another example, such holes, channels, or other openings can route the additional structural component(s) into the internal cavity during the formation thereof. Such routing and formation can thus take place after the stiffening plate has been coupled to the outer housing component to form the internal cavity.

In various other embodiments of the present disclosure, a personal electronic device can include a processor adapted to perform one or more processing tasks for a user of the personal electronic device, one or more output devices coupled to the processor and adapted to provide output to the user, an enclosure adapted to enclose at least one of the processor and output device(s), and a stiffening plate. At least a portion of the enclosure can include a substantially thin contoured component having an external surface exposed to the user and an internal surface having one or more features adapted to support one or more internal components of the personal electronic device. Also, the stiffening plate can be proximate the internal surface feature(s), and can provide a substantial increase in the torsional stiffness and/or bending stiffness across the contoured component.

In various detailed embodiments, an internal cavity can be formed between the contoured component and the stiffening plate. Furthermore, an additional structural component can be located within the internal cavity. Such an additional structural component can be a separate foam material, ridges, fins, or other features that are integrally formed from the contoured component, or both. Also, the additional structural component can have one or more stress reduction regions adapted to reduce localized compression stresses at other locations of the personal electronic device.

In various detailed embodiments, the stiffening plate can increase the torsional stiffness and/or bending stiffness across the contoured component by at least a factor of four. Furthermore, if desired, the contoured component can have a thickness of about 0.05 to about 50 mm at or about where the internal cavity is located. Also, the personal electronic device can be a laptop computer, among other possible devices. As such, the contoured component can be a dome shaped outer housing behind a display portion of the laptop computer. The stiffening plate can also have one or more stress reduction regions adapted to reduce localized compression stresses at other locations of the personal electronic device. Such stress reduction region(s) can include recesses, grooves, or openings (e.g., holes) within the stiffening plate.

In various further embodiments, methods of forming an electronic device are provided. Such methods can include various process steps, such as obtaining an enclosure component for the electronic device, forming a cavity region thereabout, and coupling a stiffening plate thereto. The enclosure component can have a substantially thin dome shaped or contoured region having an external surface to be exposed to a user of the electronic device and an internal surface to be within the electronic device. The cavity can be proximate to the internal surface of the substantially thin contoured region of the enclosure component. The stiffening plate can provides a significant increase in the torsional and bending stiffness across the substantially thin contoured region, and can in at least some embodiments increase the torsional stiffness and/or bending stiffness by a factor of 1.25, a factor of 4, or even a factor of 6 or more.

In various detailed embodiments, another process steps can be providing an additional structural component within the cavity region. Further process steps can also be added, such as reducing the thickness of the contoured region, forming on the enclosure component one or more mating features adapted for use with the stiffening plate, forming on the stiffening plate one or more load reduction features adapted to reduce loads at other locations of the electronic device, forming on the additional structural component one or more additional load reduction features adapted to reduce loads at other locations of the electronic device, and coupling the enclosure component and stiffening plate combination to the rest of the overall electronic device.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for providing electronic device enclosure stiffeners. These drawings in no way limit any changes in form and detail that may be made to the disclosure by one skilled in the art without departing from the spirit and scope of the disclosure.

DETAILED DESCRIPTION

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems and methods for providing electronic devices having enclosure components that are significantly thinner and lighter without sacrificing torsional stiffness, bending stiffness, or structural integrity. As such, this disclosure may be applied to any electronic device or even any consumer product having outer housings or other enclosure components. Although the various embodiments disclosed herein are provided with respect to laptop computers, it will be understood that the present disclosure may also be applied to smart phones, portable media players, personal digital assistants, desktop computers, and any other type of electronic device (often referred to as a "personal electronic device") having enclosure components. Furthermore, while the present disclosure focuses primarily upon outer housing components for electronic devices, it will also be appreciated that the disclosed embodiments may be similarly applied to any enclosure, or enclosure component, and not just outer housings.

The present disclosure contemplates having enclosure components that are substantially thin and lightweight. In order to compensate for any undue loss of structural strength and integrity due to such thinness, one or more internal stiffening components can be provided in conjunction with the substantially thin enclosure component(s) or component region(s). Such internal stiffening components can include a stiffening plate, and may also include further items or structural components, such as a foam layer or filler, one or more fins, ridges, honeycombs, and/or other items that can be added to provide additional torsional stiffness, bending stiffness, and/or compression strength, among other benefits.

Figure 1:
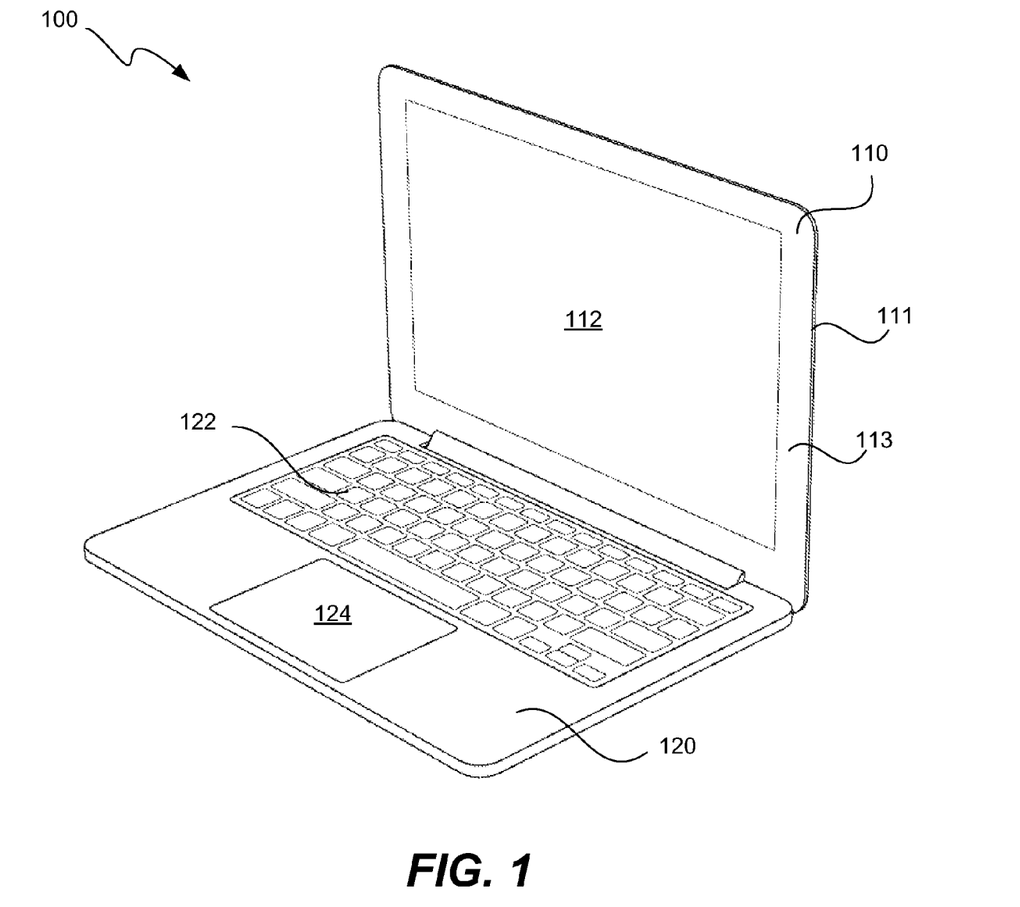
FIG. 1 illustrates in front perspective view an exemplary personal electronic device according to one embodiment of the present disclosure.

Referring first to FIG. 1, an exemplary personal electronic device according to one embodiment of the present disclosure is depicted in front perspective view. Personal electronic device 100 can be, for example, a laptop computer. One particular example of such a personal electronic device can be the Macbook Pro® laptop computer provided by Apple Inc. of Cupertino, Calif., although any other model and/or provider of laptop computers may also be suitable. Electronic device 100 can include an upper portion 110 and a lower portion 120. Upper portion 110 can include a back housing portion 111, a display 112, and a front housing portion 113, among other various components. Lower portion 120 can include a keyboard 122, a trackpad 124, and an internal processor (not shown), among other various components.

It will be readily appreciated that personal electronic device 100 can include numerous other items and components that are not shown or discussed herein for purposes of simplicity and clarity in illustration. Such items and components can include electronic components, optical components, and various other items that can be used for such devices. In general, the internal processor or processors can be adapted to perform one or more processing tasks for a user of the laptop or other personal electronic device, and the display 112 and/or one or more other output devices can be coupled to the processor and adapted to provide output to the user. The housing portions 111, 113, as well as various other enclosure components, can be adapted to enclose at least one of the processor and the one or more output devices, as well as numerous other personal electronic device components, such as input devices, memories, buses, couplers, and the like, any or all of which may also be similarly coupled to the internal processor(s).

Figure 2:
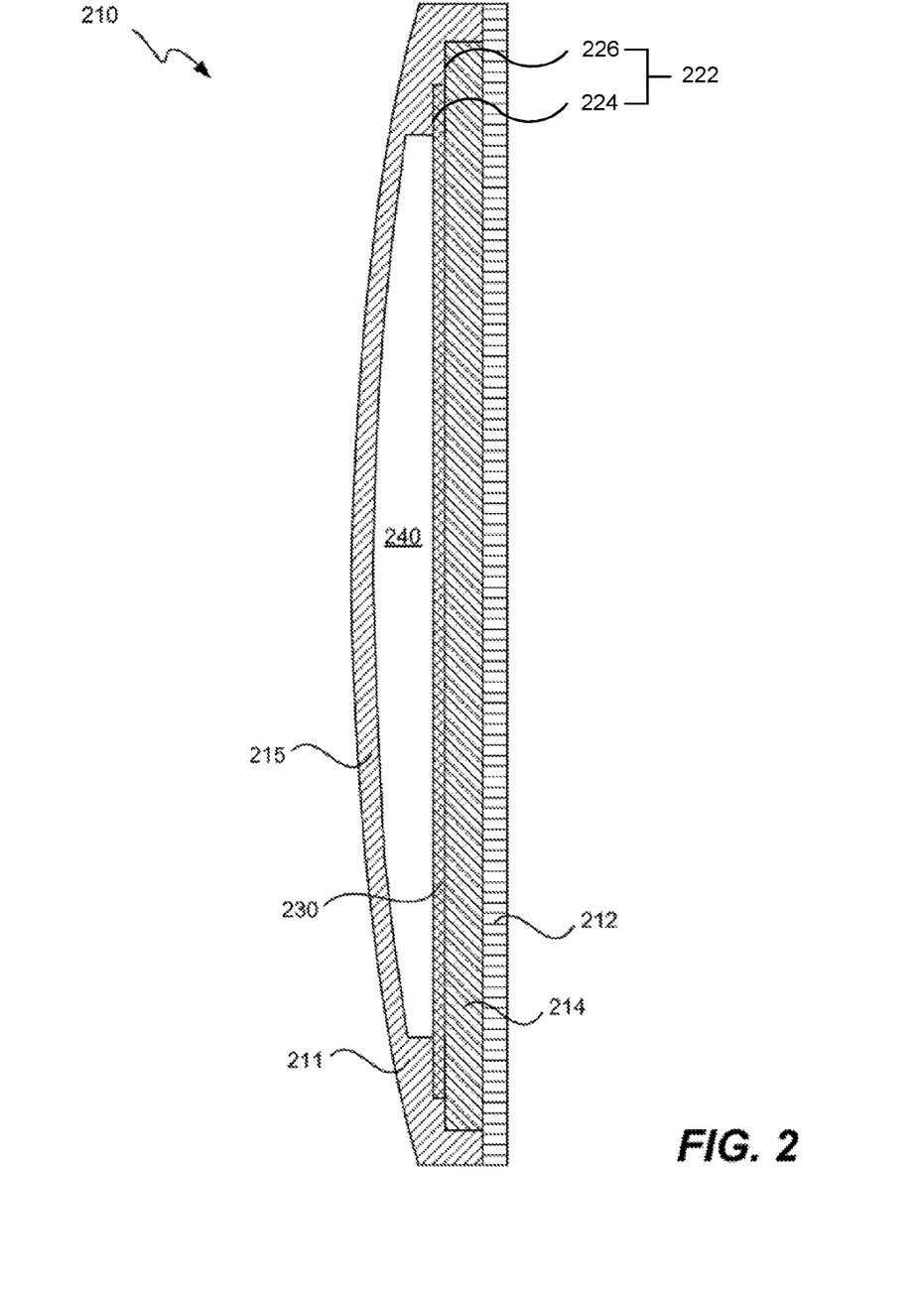
FIG. 2 illustrates in side cross-sectional view an exemplary portion of the top region of the personal electronic device of FIG. 1 according to one embodiment of the present disclosure.

Turning now to FIG. 2, an exemplary portion of the top region of the personal electronic device of FIG. 1 is illustrated in side cross-sectional view. Electronic device top region 210 can include a back housing portion 211 that defines a mounting structure 222, a display screen 212, and a backlight component stack 214, among numerous other items, many of which are not shown or detailed for purposes of clarity and simplicity in discussion. In various embodiments, a specific display stack and/or architecture can be provided, such as that which is found, for example, in the above mentioned Macbook Pro® laptop computer. As such, the display components can be assembled directly into the housing, such that they generally do not take advantage of structure and stiffness created by a more modular level "display frame" that is often used in laptop display assemblies.

In addition, a stiffening plate 230 can be coupled to back housing portion 211 a first step 224 of the mounting structure 222 to provide additional torsional stiffness and bending stiffness, particularly across a substantially thin contoured region 215 of the back housing portion 211. The backlight component stack 214 is secured to a second step 226 (located outside the first step 224) of the mounting structure 222. Also, the first step 224 and the second step 226 define a first opening and a second opening, respectively. This contoured region 215 can be dome shaped, for example. Such added stiffness can be even more useful where display components are assembled directly into the housing, as noted above. The stiffening plate 230 can provides a significant increase in the torsional and bending stiffness across the substantially thin contoured region, and can in at least some embodiments increase the torsional stiffness and/or bending stiffness by a factor of 1.25, a factor of 4, or even a factor of 6 or more.

The stiffening plate 230 may also provide support to the various display components 212, 214, and/or other items that may be assembled as part of electronic device top region 210. As a particular example, stiffening plate 230 can provide support for a reflector layer of an LCD backlight. Because such a reflector layer can be sensitive to waviness and any non-planar irregularities, this reflector layer often requires an additional stiffening layer laminated thereto in order to provide adequate stiffness to prevent wrinkling or drooping inside domed or other contoured enclosures. As such, the LCD backlight reflector layer can be laminated directly or in close proximity to the stiffening plate 230, which can eliminate the need for a separate reflector layer stiffener, thereby reducing overall thickness and further integrating the display assembly with the enclosure and plate assembly.

An internal cavity 240 may be provided between the stiffening plate 230 and contoured region 215. Internal cavity 240 may be empty, or may contain one or more additional structural components to provide strength and/or stiffness across region 215, as set forth in greater detail below. Also, cavity 240 may range in thickness from about 1.0 to about 10.0 mm, although other cavity thicknesses are also possible for this or other applications. Such an internal cavity 240 can provide an insulative layer or "cushion" between the device exterior and one or more internal components, such as display screen 212 and/or other display stack components. This insulative layer can help to prevent damage from impact, excessive compression, puncture, or the like.

Back housing portion 211 may be formed from any number of materials suitable for an external housing of an electronic device. Such materials can include, for example, various plastics, ceramics, glass, composites, and/or metals such as aluminum, steel, brass, or the like. In one particular example, housing component 211 can be formed from anodized aluminum. The contoured region 215 can extend across the majority of the length and width of back housing component 211, and can be made substantially thin. In various embodiments, this contoured region 215 formed from anodized aluminum can have a thickness of about 0.05 to about 50 mm, although other thicknesses are certainly possible. Such a substantially thin dimension can then result in reductions in size and weight to housing component 211, which can result in an overall lighter and sleeker electronic device. Of course, this thickness range can also change in the event of smaller or larger form factor devices.

In order to compensate for any undue losses in strength, torsional stiffness, bending stiffness, and structural integrity of a substantially thin housing component 211, a suitably strong stiffening plate 230 can be added at the interior of the device. Such a stiffening plate 230 can be formed from a stronger material than housing component 211. For example, a composite or hardened plastic may be used, such that added stiffness for a relatively light material is provided. In various embodiments, the stiffening plate 230 can be generally planar in nature, and can have a thickness of about 0.20 to 1.0 mm. In other embodiments, the stiffening plate 230 might be thicker for greater structural needs, or might be even thinner where sufficient structural integrity can be provided thereby. Of course, such thickness and other dimensions may vary depending upon the size and scale of the overall device and related components. Because stiffening plate 230 is located within the overall electronic device, various finishing and cosmetic effects are generally not needed to maintain overall external aesthetic appearances, such that added costs may be saved with respect to such items.

Figure 3:
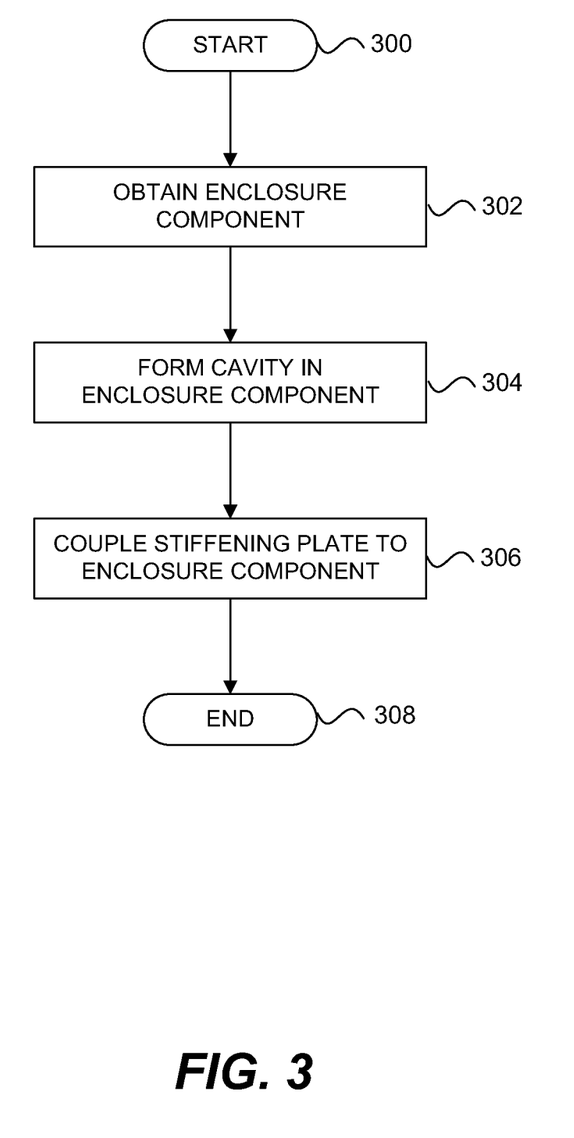
FIG. 3 provides a flowchart of an exemplary method of forming a stiffened portion of an electronic device enclosure according to one embodiment of the present disclosure.

Moving next to FIG. 3 a flowchart of an exemplary method of forming a stiffened portion of an electronic device enclosure is provided. It will be understood that the provided flowchart is general in nature, and that further steps and details may also be applicable in various implementations. After a start step 300, an enclosure component is obtained at process step 302. Such an enclosure component can be any suitable item, such as housing component 211 described above, for example. At a subsequent process step 304, a cavity can be formed in the obtained enclosure component. For example, the cavity can be formed by machining out material from the enclosure component in a suitable manner. In some embodiments, a suitable cavity may already be formed or may be inherent to the obtained enclosure component.

A stiffening plate can then be coupled to the enclosure component at process step 306. Such a coupling can be made such that the formed cavity is then provided or accentuated, such as that which is shown above in FIG. 2. Alternatively, the enclosure component and stiffening plate can be integrally formed, such that a "coupling" step can essentially be a formation step. Such integrally formed enclosure and plate formation processes can include, for example, casting, additive manufacturing methods (with or without supporting ribs), metal or plastic blow molding, hydroforming, and extrusion plus edge sealing, among other suitable ways. The method then ends at end step 308.

Figure 4:
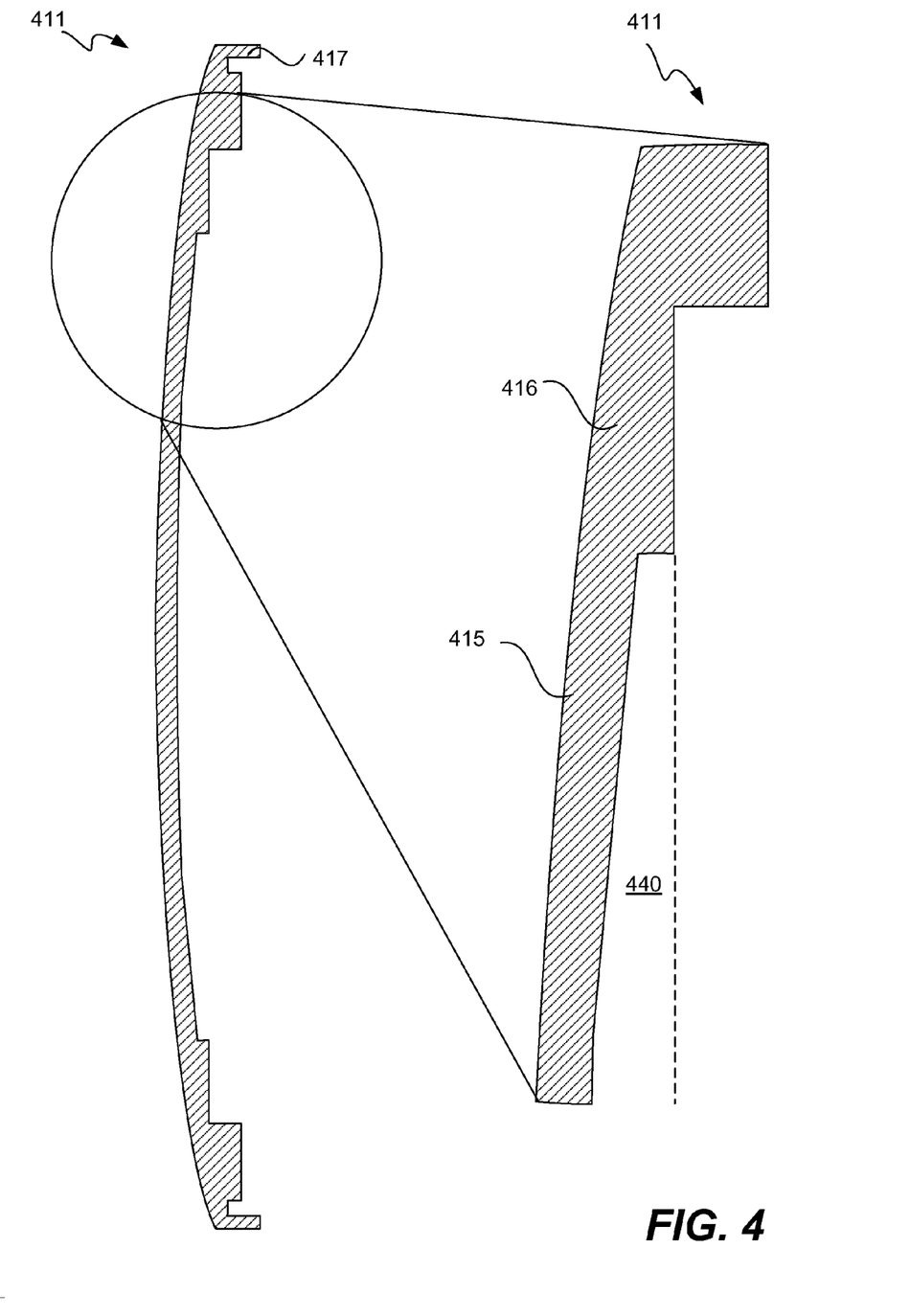
FIG. 4 illustrates in side cross-sectional view an exemplary electronic device enclosure component according to one embodiment of the present disclosure.

FIG. 4 illustrates in side cross-sectional view an exemplary electronic device enclosure component according to one embodiment of the present disclosure. Enclosure component 411 can be the same or substantially similar to housing component 211 above, although there may be some differences. As shown, a blown up region or portion of enclosure component 411 is provided for purposes of illustration. Such a blown up region excludes the ends, end features 417, and most of the middle substantially thin portion 415 of enclosure component 411, and instead focuses attention on the various portions and features that are more pertinent to the present disclosure. Correspondingly similar blown up regions or portions of enclosure components will also be used in other drawings below for purposes of illustration and discussion. It will be understood that some of the various features disclosed and discussed with respect to these isolated blown up regions may also be extended further into and/or throughout the remaining middle portion that is not shown for purposes of clarity in illustration.

Enclosure component 411 can be part of an outer housing for an electronic device, such as a laptop computer. Alternatively, enclosure component 411 can be a part of any enclosure associated with an electronic device or other suitable item, such as, for example, an internally isolated item. Among other features, enclosure component 411 can include a substantially thin region 415, which can be contoured or even dome shaped in nature. Enclosure component 411 can also include a thicker region 416 that may generally surround the more prevalent thin region 415. Substantially thin region 415 can result in the formation of a more open region or cavity 440, particularly when enclosure component 411 is coupled with one or more other electronic items, such as a display backlight component stack, for example. Such a coupling may result in such other item(s) (not shown) abutting at and traversing across the depicted dotted line, for example, thus creating or accentuating cavity 440 thereby. One or more end features 417 can be used to couple enclosure component 411 to one or more other electronic device items (not shown). Because the details of such end features 417 may not be particularly pertinent, these items are excluded from further blown up illustrations and discussions.

Figure 5A:
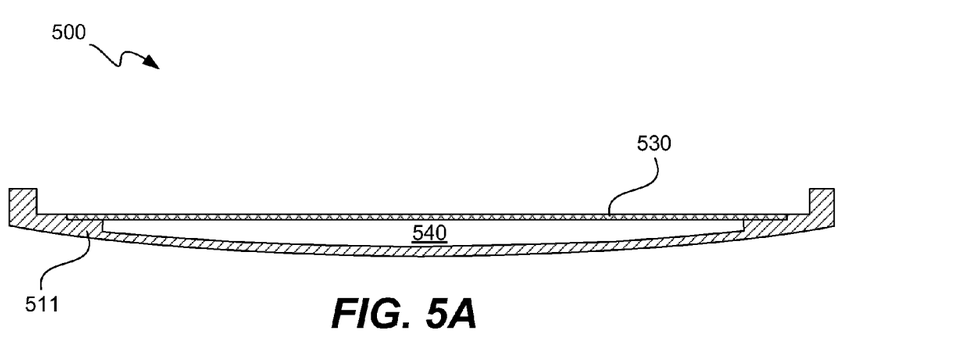
FIG. 5A illustrates in rotated side cross-sectional view an exemplary electronic device enclosure component and coupled stiffening plate according to one embodiment of the present disclosure.
Figure 5B:
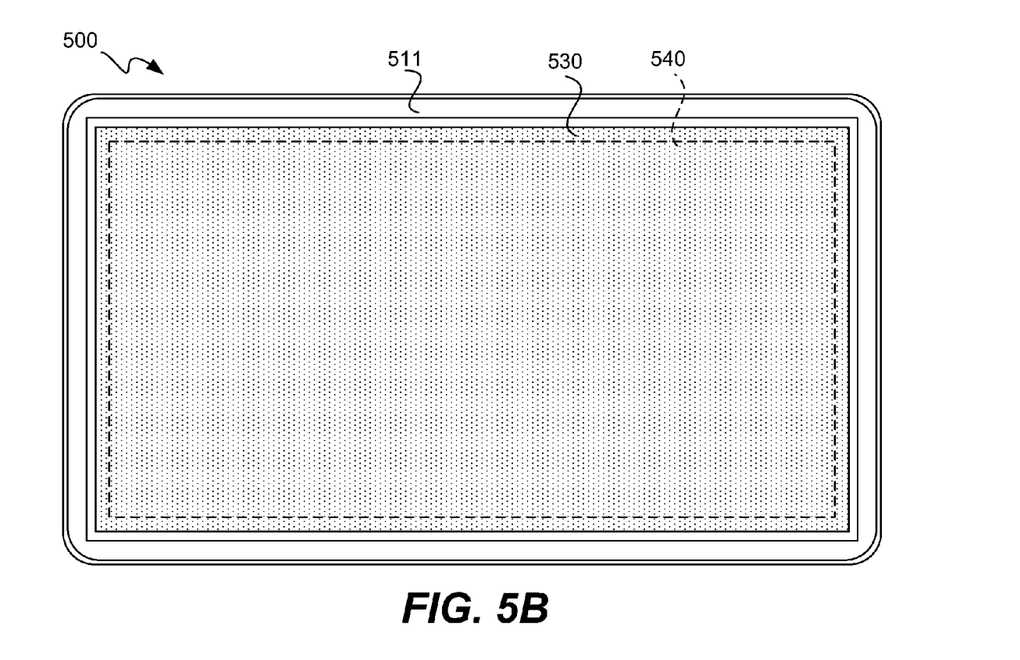
FIG. 5B illustrates in top plan view the exemplary enclosure component and plate combination of FIG. 5A according to one embodiment of the present disclosure.

Considering now FIGS. 5A and 5B, an exemplary electronic device enclosure component and coupled stiffening plate are shown in rotated side cross-sectional and top plan views respectively. Enclosure combination 500 includes an outer enclosure component 511 and a stiffening plate 530 coupled thereto, with a cavity 540 created between the two items. As shown, the stiffening plate 530, which can be substantially similar to stiffening plate 230 above, can couple to and extend across most of the outer enclosure component 511, which can be substantially similar to enclosure components 211 and 411 above. Again, stiffening plate 530 can provide additional structural integrity, bending stiffness, and torsional stiffness to enclosure component 511, particularly with respect to the thin walled region spanning across most of the enclosure component, which thin walled region can be contoured.

Figure 6A:
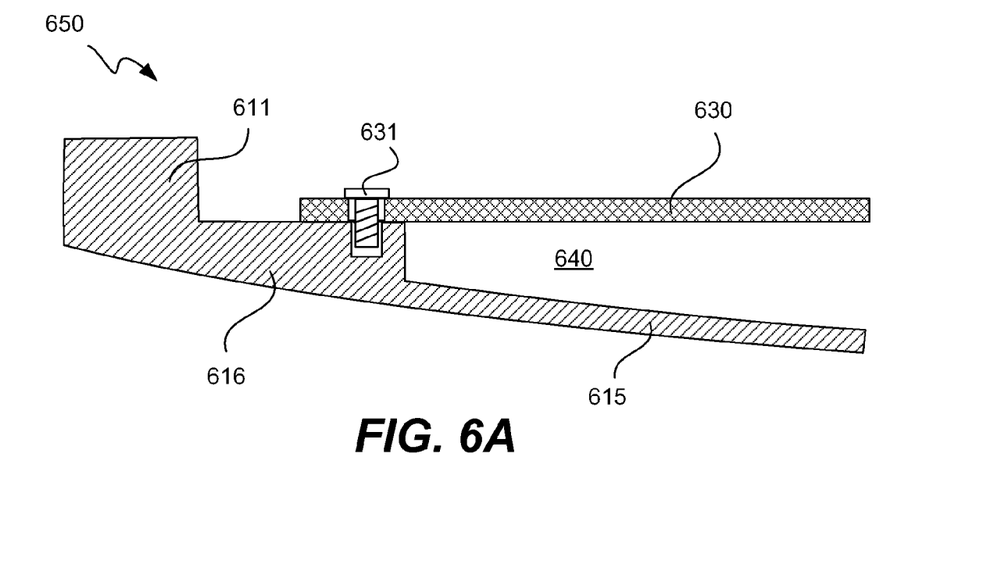
FIG. 6A illustrates in rotated side cross-sectional view an exemplary way to couple a stiffening plate to an electronic device enclosure component according to one embodiment of the present disclosure.
Figure 6B:
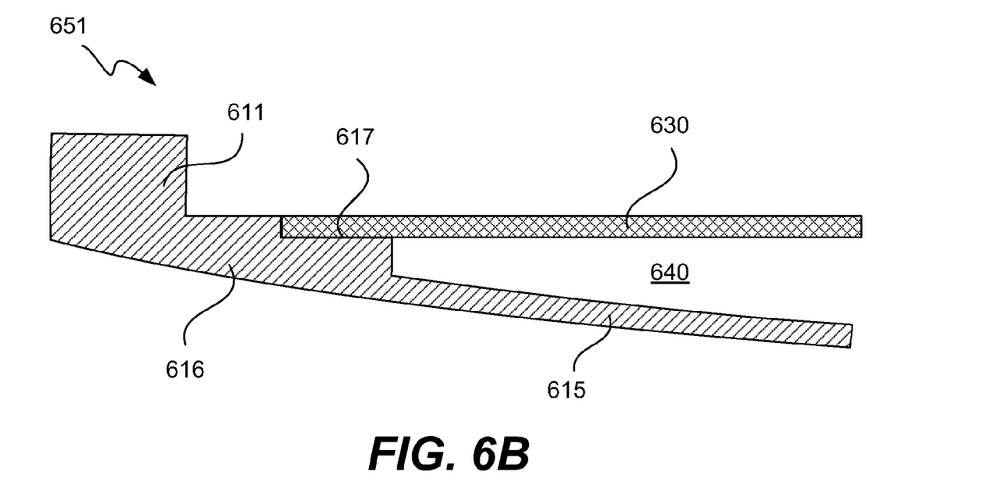
FIG. 6B illustrates in rotated side cross-sectional view an alternative exemplary way to couple a stiffening plate to an electronic device enclosure component according to one embodiment of the present disclosure.

Turning now to FIGS. 6A and 6B, various ways of coupling a stiffening plate to an electronic device enclosure component are shown in rotated side cross-sectional view. As noted with respect to FIG. 4, the provided views depict blown up portions of overall stiffening plate and enclosure component combinations, and it will be readily appreciated that the illustrated items extend considerably further to form full and completed items. In FIG. 6A, a blown up portion of enclosure combination 650 finds an enclosure component 611 and a stiffening plate 630 coupled thereto, such that an internal cavity 640 is formed therebetween. As in the foregoing examples, enclosure component 611 can include a thicker region 616 near the edges and a substantially thin contoured region 615 in between and extending therefrom. Stiffening plate 630 can be coupled to enclosure component 611 by way of one or more fasteners 631, which can be screws, bolts, rivets, or the like. Accordingly, each of plate 630 and component 611 can have suitable threaded holes, openings, and/or other features formed therein and adapted for such fasteners 631. As shown, the fasteners can be placed about the thicker region 616 of enclosure component 611, although other arrangements are also possible.

An alternative way of coupling these items is shown in FIG. 6B. Here, enclosure combination 651 also provides an enclosure component 611 and a stiffening plate 630 coupled thereto, such that an internal cavity 640 is formed therebetween. Instead of fasteners, however, a chamfer or shelf 617 can be formed around the edge of thicker region 616 of enclosure component 611. Such a chamfer or shelf 617 can be machined or otherwise created into enclosure component 611 in a manner that accounts for the size and dimensions of stiffening plate 630. Accordingly, the stiffening plate 630 may be press-fit or otherwise snugly fastened to the enclosure component 611 at and about this shelf region 617. In addition, or alternatively, suitably adapted glue, paste, welds, and/or other items can be used to facilitate the fastening or coupling of plate 630 to enclosure component 611 at or about shelf region 617.

It will be readily appreciated that any number of other fastening or coupling techniques and items may be used to couple the stiffening plate to the enclosure component, and it is specifically contemplated that any suitable way of coupling may be used for these items. Such other ways can include for example, press-fit notches, holes, grooves, or other features on one of the items, corresponding features on the other item, glue, paste, or welds without the use of a chamfer or shelf region, and one or more mechanical interlocking items or features one or more both of the plate and housing. In addition, while the plate 630 is shown as resting above and across the cavity 640, it will be readily appreciated that some or all of the plate may extend down into the cavity and provide lateral support against the sidewalls thereof in some embodiments.

In still further embodiments, the stiffening plate can be integrally formed with the enclosure component. This can be accomplished, for example, by casting a single item having the provided arrangement of thin contoured region, cavity, and stiffening plate. Other formation or manufacturing techniques that can result in an integrally formed enclosure component and stiffening plate can include, for example, additive manufacturing methods (with or without supporting ribs), metal or plastic blow molding, hydroforming, and extrusion plus edge sealing, among other suitable ways.

Figure 7A:
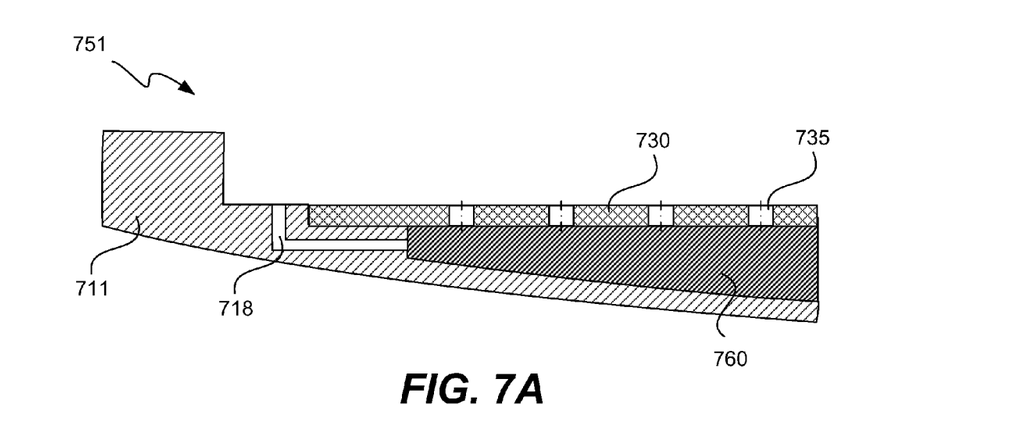
FIG. 7A illustrates in rotated side cross-sectional view an exemplary enclosure component, stiffening plate, and additional structural component combination according to one embodiment of the present disclosure.

As noted above, one or more additional stiffening or structural items can be provided in addition to just the stiffening plate. Such one or more additional structural items can be located in or about the cavity, for example. Moving next to FIGS. 7A through 7C, various exemplary enclosure component, stiffening plate, and additional structural component combinations according to further embodiments of the present disclosure are illustrated in rotated side cross-sectional views. In FIG. 7A, a blown up portion of enclosure combination 751 provides an enclosure component 711 and a stiffening plate 730 coupled thereto, such that an internal cavity is formed therebetween. Unlike the foregoing examples, however, the internal cavity is not empty, but is rather filled with an additional structural component 760.

Such an additional structural component 760 may completely fill the internal cavity as shown. Alternatively, structural component or components 760 may partially fill all or a portion of the internal cavity between the plate and enclosure component. This added structural component 760 can be a foam material, for example, which may be added before or after the stiffening plate 730 is coupled to the enclosure component 711. This can be accomplished after a plate to housing coupling (or other formation) by way of, for example, one or more channels, holes, and/or other openings 735 formed in plate 730, through which the foam material may be injected and then left to harden or set. Alternatively, or in addition to opening(s) 735 in plate 730, one or more channels, holes, and/or other openings 718 may be formed in enclosure component 711 to route material into the internal cavity. The foam material can be lightweight, yet provide added strength, rigidity, and torsional and bending stiffness to the overall structure beyond that which is provided by just an empty cavity.

Alternatively, or in addition to structural component(s) 760, one or more other components (not shown) may also be provided within the internal cavity. Such other component(s) can be non-structural in nature, and may include, for example, connectors, wires, flex circuits, and the like, as well as integrated circuitry, storage, LEDs, and/or other electronic components. Such non-structural components may also or alternatively be routed into, out of or through the internal cavity by way of opening(s) 735 formed in plate 730 and/or opening(s) 718 formed in enclosure component 711. Such items may in some cases be re-routed, removed, and/or replaced within the internal cavity without removing the plate 730, since openings 735 and/or 718 may be utilized for such purposes. Such additional non-structural components may be located within the internal cavity without or along with structural component(s) 760 that might be present.

Although some increases in torsional and/or bending stiffness may be observed through the use of such an additional structural component(s) 760, the presence of this item can significantly improve the compressive stiffness and strength of the overall assembly (i.e., when the housing is compressed in a direction normal to its surface). Further, the hardness of additional structural component 760, any air gap, and the stiffness of the stiffening plate 730 can all be adjusted and fine-tuned in order to provide optimal load distribution and deflection characteristics, such as to distribute load over the device display and/or reduce various pressure points about the overall device.

Figure 7B:
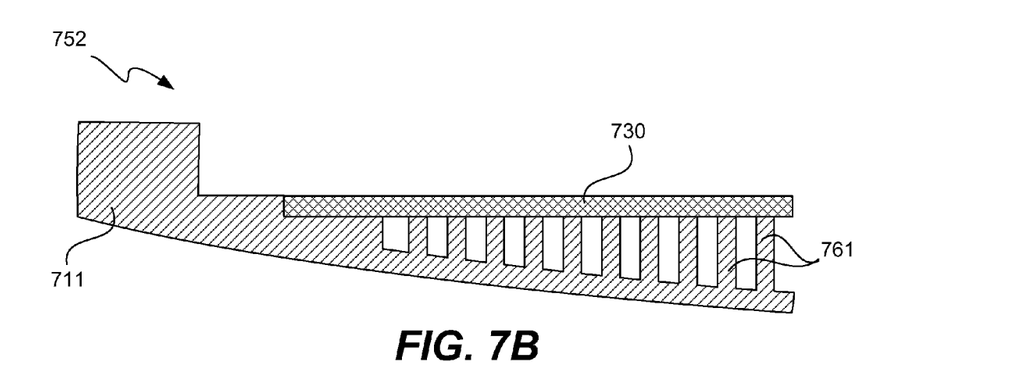
FIG. 7B illustrates in rotated side cross-sectional view an alternative exemplary enclosure component, stiffening plate, and additional structural component combination according to one embodiment of the present disclosure.

In FIG. 7B, a blown up portion of enclosure combination 752 similarly provides an enclosure component 711 and a stiffening plate 730 coupled thereto, such that an internal cavity is formed therebetween. Instead of a fully filled foam or other structural component, however, a plurality of ridges or fins 761 can extend from the thin region of enclosure component 711 to the stiffening plate 730. Such fins, ridges, or other structural components 761 can be separate items from the plate 730 and component 711, such as by an inserted piece or pieces into the cavity.

Alternatively, fins, ridges, or other structural items 761 can be integrally formed with or from the enclosure component 711, such as by machining, etching, or other manufacturing process during the creation of the cavity within the enclosure component. As yet another alternative, structural items 761 can be integrally formed with or from the stiffening plate 730. In some embodiments, the added structural components can be any combination of separate items, integrally formed with the enclosure component, and/or integrally formed with the stiffening plate. For example, the added structural components can include fins integrally formed from the enclosure component, fins integrally formed from the stiffening plate, and a separate foam as well. Such added structural items could also be added or coupled to one or both of the enclosure component 711, and the stiffening plate 730, such as by glue, welding, screws, or the like. Again, such added structural items can be lightweight in comparison with a reduced or nonexistent cavity, yet provide added compression strength, rigidity, and/or torsional and bending stiffness to the overall structure beyond that which is provided by having only an empty cavity.

Figure 7C:
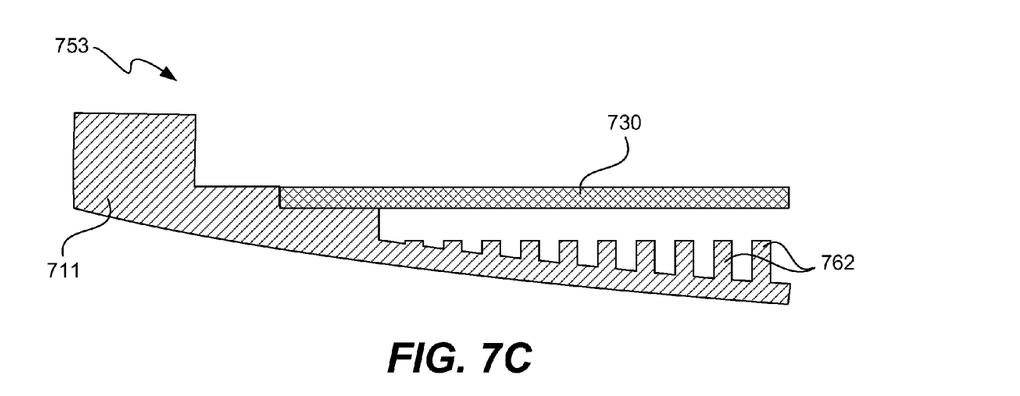
FIG. 7C illustrates in rotated side cross-sectional view yet another alternative exemplary enclosure component, stiffening plate, and additional structural component combination according to one embodiment of the present disclosure.

In FIG. 7C, a blown up portion of enclosure combination 753 also provides an enclosure component 711 and a stiffening plate 730 coupled thereto forming a cavity. Instead of illustrating a fully filled foam or fully extended ridges, fins or other features, however, a plurality of shortened ridges, fins, bumps, or other features 762 is shown to extend from the thin region of enclosure component 711 into the cavity and toward the stiffening plate 730. Such shortened fins, ridges, or other structural components 762 can again be separate items, or can be integrally formed with or from the enclosure component 711 and/or the stiffening plate 730. Again, such items can provide some additional compression strength, bending stiffness, and/or torsional stiffness beyond that which is provided by only an empty cavity.

Other additional structural items may be provided in addition to or separate from these examples, and it will be understood that these and other such additional structural items may also be provided in combination. For example, ridges 761 may be combined with inserting a foam material 760 into the cavity. Again, one or more holes, channels, and/or other openings can be created in the stiffening plate 730 and/or enclosure component 711, such that a foam material and/or other structural components can be routed into the internal cavity. Again, one or more non-structural components, such as connectors, wires, or flex circuits, can also be routed into or out of the internal cavity by way of holes or channels in the stiffening plate or enclosure component. Again, the internal cavity itself may also contain integrated circuitry, storage, LEDs, or other electronic components. Providing added structural component(s) 760 and/or one or more non-structural components within the internal cavity can be done at any time, such as after the stiffening plate has been coupled to the enclosure component.

Figure 8A:
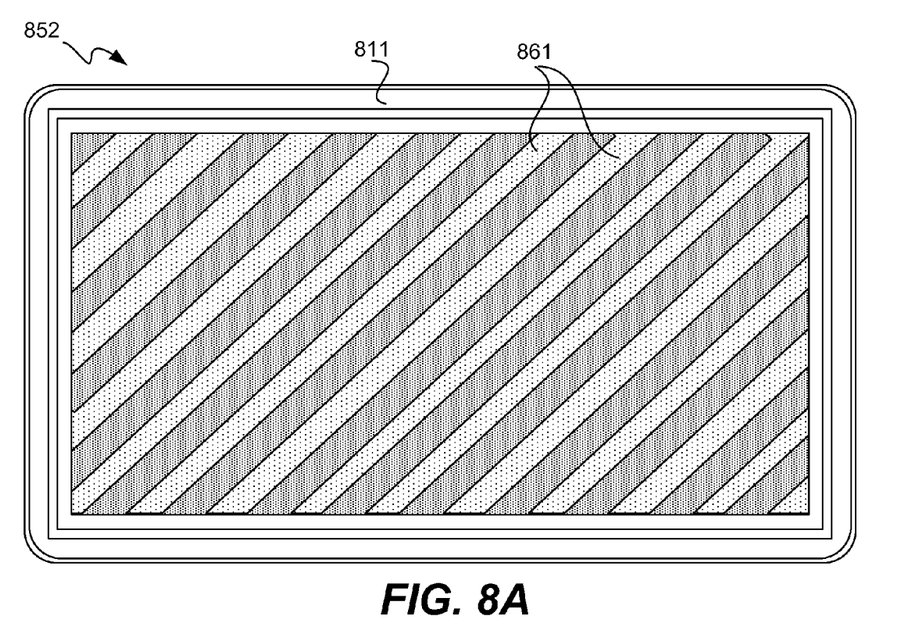
FIG. 8A illustrates in top plan view an exemplary enclosure component and additional structural component combination according to one embodiment of the present disclosure.
Figure 8B:
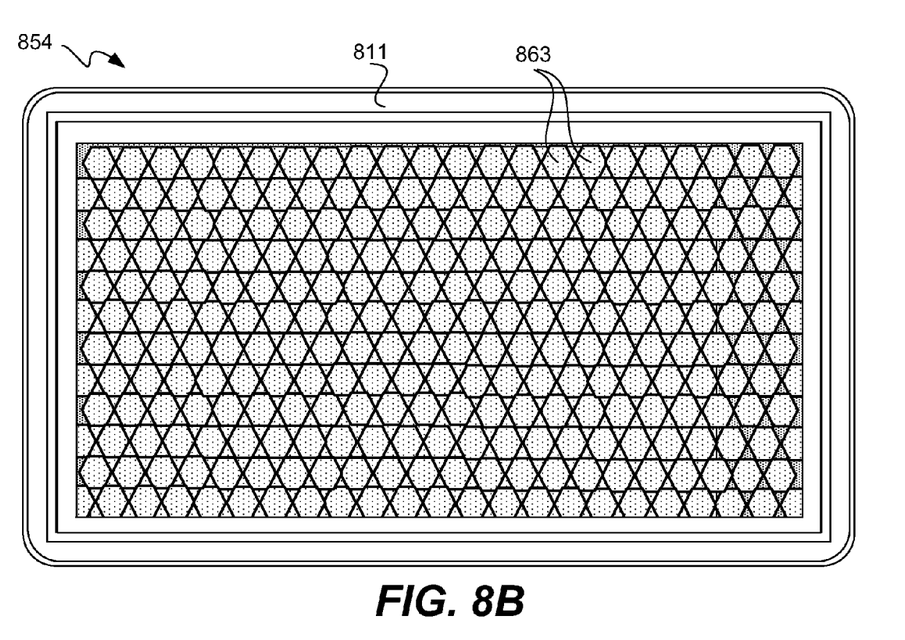
FIG. 8B illustrates in top plan view an alternative exemplary enclosure component and additional structural component combination according to one embodiment of the present disclosure.

Continuing with FIGS. 8A and 8B, exemplary enclosure component and additional structural component combinations according to various embodiments of the present disclosure are depicted in top plan view. FIG. 8A provides an enclosure combination 852 that may correspond to that which is shown in FIG. 7B or 7C, for example. Enclosure combination 852 includes enclosure component 811 and additional structural component 861, which can be ridges, fins, and/or other features that may extend upward from the internal bottom surface of the thin portion of the enclosure component. Again, such an additional structural component 861 can be separate and/or can be integrally formed with or from enclosure component 811. Also, these additional structural component feature(s) 861 can be arranged in any of a variety of suitable patterns that may be relatively easy to form, and which may provide added strength and stiffness while using less material and thus less weight. Again, such additional structural component feature(s) 861 may rise only partially, or may extend all the way up to a stiffening plate (not shown) that couples to and rests across the enclosure component 811.

FIG. 8B provides an enclosure combination 854 that can includes a similar enclosure component 811, but with a different additional structural component 863. This different additional structural component 863 can be a honeycomb formation, for example. Again, additional structural component 863 can be separate from or integrally formed with enclosure component 811, and can rise partially toward or all the way to a bottom surface of a subsequently coupled stiffening plate.

Although the stiffening plate and/or additional structural components that are disclosed herein may provide added compression strength, bending stiffness, and torsional stiffness and support to an associated enclosure component, such as a device outer housing, these added items may interfere in one or more other ways with other components of the electronic device. Accordingly, one or more other features may be incorporated into these components. For example, localized compression stresses may stack up and affect various device components in some cases. In the laptop computer examples provided herein, such device components that may be affected can include the display, keyboard, and/or trackpad, among other possible items. Such items may include sharp transitional edges thereabout, for example, whereby it may be desirable to alleviate localized compression stresses, such as when the laptop may be closed or otherwise compressed.

Figure 9A:
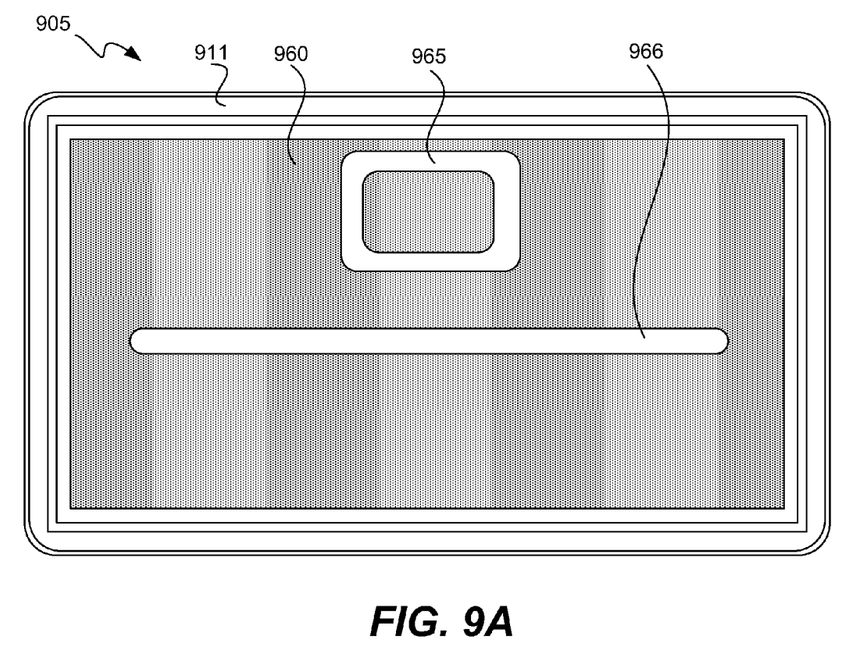
FIG. 9A illustrates in top plan view an exemplary enclosure component and additional structural component having load reduction features formed therein according to one embodiment of the present disclosure.

Turning now to FIG. 9A, an exemplary enclosure component and additional structural component having load reduction features formed therein is shown in top plan view. Enclosure combination 905 that can include an enclosure component 911 and an additional structural component 960, such as a foam material, that is inserted into the cavity region of the enclosure component. Because various compression stresses may be translated throughout the entire laptop device when it is closed, localized features 965 and 966 can be included in the additional structural component 960. Such features 965, 966 can be recesses, indentations, gaps, or holes in the overall foam material or other stiffening component 960. These features 965, 966 can be adapted to reduce or eliminate localized compression stresses that are observed at other corresponding locations on the laptop or other electronic device. By way of example, feature 965 can correspond to the edges of a trackpad that are correspondingly located on the laptop, while feature 966 can correspond to an edge of a keyboard that is correspondingly located on the laptop.

Figure 9B:
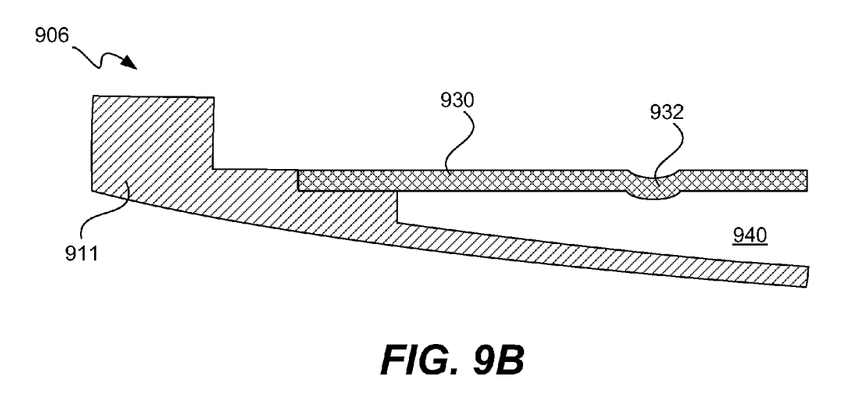
FIG. 9B illustrates in rotated side cross-sectional view an exemplary enclosure component and stiffening plate having load reduction features formed therein according to one embodiment of the present disclosure.

Continuing with FIG. 9B, an exemplary enclosure component and stiffening plate having load reduction features formed therein is illustrated in rotated side cross-sectional view. Enclosure combination 906 includes an enclosure component 911 and a stiffening plate 930 coupled thereto, such that a cavity 940 is formed therebetween. Again, a foam material or other additional structural component (not shown) can be inside of this cavity 940. Similar to the additional structural component 960 shown above, the stiffening plate 930 can have one or more localized features 932 that are adapted to reduce or eliminate localized compression stresses that are observed at other corresponding locations on the laptop or other electronic device. The localized feature(s) 932 on stiffening plate 930 can be a gap, indentation, groove, hole, opening, or other item that is adapted to alleviate compression stresses at a corresponding location on the overall device. For example, groove 932 can run along the plate 930 in a pattern that is similar to that which is shown for the top plan view of foam material or other stiffening item 960.

Figure 10:
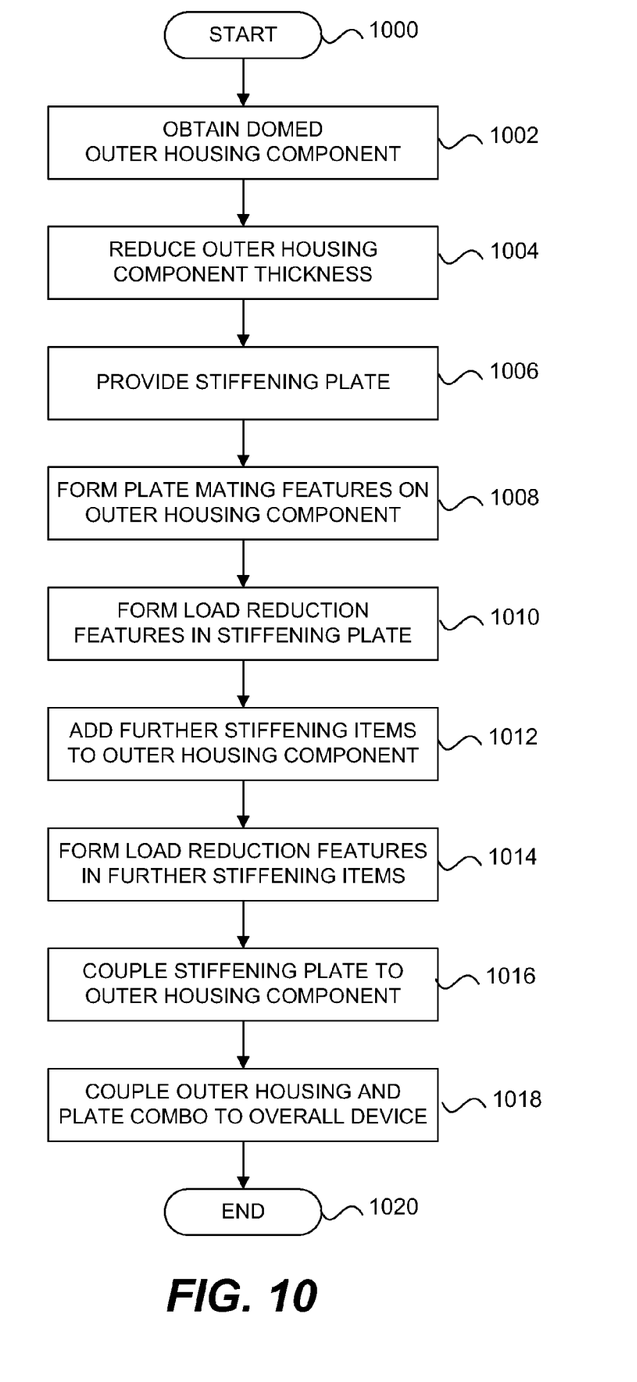
FIG. 10 provides a flowchart of an exemplary method of forming an electronic device having an enclosure stiffener according to one embodiment of the present disclosure.

Moving lastly to FIG. 10, a flowchart of an exemplary method of forming an electronic device having an enclosure stiffener is provided. After a start step 1000, a suitable outer housing component is obtained at a process step 1002. As noted above, such an outer housing component can have a contoured or dome shaped region. At an optional process step 1004, the thickness of this outer housing component can be reduced. Again, it may be desirable to have a substantially thin dome shaped region. In some embodiments, the obtained outer housing component may already be substantially thin, and in others the thickness of this component may be further reduced. In addition, one or more channels or other openings may be formed in the outer housing component, such as to inject or otherwise provide an added foam or other filler material into an internal cavity to be formed later. Such channels and/or other openings may also be used to route non-structural items such as wires and flex circuits into or out of the internal cavity, which might also contain integrated circuitry, storage, LEDs, or other electronic components therewithin.

At a process step 1006, a stiffening plate may be provided. Such a stiffening plate may be any of those which are described in detail above. Mating features suitable for use with the stiffening plate can be formed on the outer housing component at process step 1008, and one or more openings as well as one or more load reduction features can be formed in the stiffening plate at process step 1010. Again, such mating features, openings, and load reduction features are set forth in greater detail above. One or more further structural items or components can be added to the outer housing component at process step 1012. Such further structural item(s) can be located within a cavity region, and can be any of the examples described above. Further load reduction features can also be formed in these further structural item(s) or components at process step 1014. Again, such load reduction features are described in detail above.

At a subsequent process step 1016, the stiffening plate can be coupled to the outer housing component. Again, this can be accomplished by way of a press fit, glue, screws, bolts, physical interlock, and/or any other suitable way of coupling or fastening these items. The combination outer housing component and stiffening plate, with additional structural items if applicable, can then be coupled to the overall electronic device at process step 1018. The method then ends at end step 1020.

For the foregoing flowchart, it will be readily appreciated that not every method step provided is always necessary, and that further steps not set forth herein may also be included. For example, added steps may include further formation details with respect to any of the contoured outer housing component, stiffening plate, and/or further structural items or components. As noted above, the enclosure component and stiffening plate could also be integrally formed, such that a "coupling" step can essentially be a formation step. Again, such integrally formed enclosure and plate formation processes can include, for example, casting, additive manufacturing methods (with or without supporting ribs), metal or plastic blow molding, hydroforming, and extrusion plus edge sealing, among other suitable ways. As such, the provided flowchart provides examples of only some ways for forming an electronic device having an enclosure stiffener. Other ways that could involve an integral formation of housing component and stiffening plate are thus also possible, as will be readily appreciated.

Furthermore, the exact order of steps may be altered as desired, and some steps may be performed simultaneously. For example, step 1008 may be performed before or after step 1006 in various embodiments. As another example, steps 1010, 1012, and 1014 can be performed simultaneously or in any order. As yet another example, adding further items step 1012 can be performed after coupling step 1016, such as where channels, holes, or other openings are formed in the stiffening plate, the outer housing component, or both, and a foam material or other further stiffening item is injected into the internal cavity through the opening(s) after the stiffening plate is already coupled to the outer housing component. Such opening(s) can be formed before and/or after coupling step 1016, as will be readily appreciated. Also, such opening(s) can be used to route, remove, or replace one or more non-structural items, such as wires, flexes and connectors, into or out of the internal cavity, which internal cavity might also contain integrated circuitry, storage, LEDs, or other electronic components therewithin. In addition, while the provided examples are with respect to laptop computers, it will be readily understood that any other electronic device may be similarly applicable.

Those skilled in the art will readily appreciate that any of the components, devices, and methods of the present disclosure may include the use of various computer and network related software and hardware, such as computing programs, operating systems, memory storage devices, data input/output devices, data processors, and the like. Those skilled in the art will further appreciate that the precise types of software and hardware used are not vital to the full implementation of the various components, devices, and methods of the present disclosure, and that the various embodiments disclosed herein may be applied to any form of electronic device.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An electronic device, comprising:
   a housing having a body that includes a cavity for accommodating components, the housing comprising:
   a mounting structure that includes a first step within the cavity that defines a first opening, the mounting structure further including a second step within the cavity and surrounding the first step, the second step defining a second opening that is larger than the first opening, wherein the first step and the second step are integrally formed from the body,
   a contoured region having curvature from a first outermost edge to a second outermost edge opposite the first outermost edge;
   a stiffening plate secured with the mounting structure at the first step, the stiffening plate spanning across the first opening to maintain the curvature of the contoured region; and
   a display component that spans from the first outermost edge to the second outermost edge and covers the stiffening plate, wherein the mounting structure further comprises a third step that surrounds the second step, the third step defining the first outermost edge and the second outermost edge, wherein the display component is positioned on the third step.

2. The electronic device of claim 1, wherein the contoured region is integrally formed with the mounting structure.

3. The electronic device of claim 2, wherein the stiffening plate includes an opening adapted to route non-structural components into or out of the cavity.

4. The electronic device of claim 1, further comprising a structural component is located within the cavity, wherein the structural component comprises a separate foam material.

5. The electronic device of claim 1, further comprising a ridge that is integrally formed with the contoured region, the ridge extending from the body and engaging the stiffening plate.

6. A personal electronic device, comprising:
a processor adapted to perform processing tasks;
a display component in communication with the processor; and
an enclosure body that defines in part a cavity for accommodating at least the processor, the enclosure body having an exterior surface, the enclosure body comprising:
a mounting portion for mounting components thereon and having a wall that defines a first step within the cavity, the first step having a first edge that defines a first opening, the wall further defining a second step within the cavity with a second edge surrounding the first edge, the second edge defining a second opening and further defining a first thickness, the wall further defining a third step that includes a third edge external with respect to the second edge,
a curved region integral with and supported by the mounting portion that in cooperation with the first step and the second step defines the cavity, the curved region including an interior surface having a shape that matches the shape of the exterior surface and that has a second thickness that is less than the first thickness, and
a stiffening plate supported by the mounting portion at the first step, the stiffening plate extending across the first opening and assisting in maintaining a rigidity of the curved region, wherein the display component includes a first component that is secured to and supported by the mounting portion at the second step, and wherein the display component includes a second component coupled with the first component and supported by the third step.

7. The personal electronic device of claim 6, wherein the stiffening plate defines a spanned portion of the cavity.

8. The personal electronic device of claim 7, wherein a foam structural component is located within the spanned portion of the cavity.

9. The personal electronic device of claim 8, wherein the structural component comprise stress reduction regions adapted to reduce localized compression stresses at other locations of the personal electronic device.

10. The personal electronic device of claim 7, further comprising a structural component located within the spanned portion of the cavity that comprises ridges, fins, or other features that are integrally formed with the curved region.

11. The personal electronic device of claim 6, wherein the stiffening plate comprises an opening adapted to route components into or out of cavity.

12. The personal electronic device of claim 6, wherein the personal electronic device comprises a laptop computer.

13. The personal electronic device of claim 12, wherein the curved region comprises a dome shape.

14. The personal electronic device of claim 6,
wherein the display component is coupled to and supported by the stiffening plate.

* * * * *